United States Patent [19]
DiMaria

[11] Patent Number: 6,148,091
[45] Date of Patent: *Nov. 14, 2000

[54] APPARATUS FOR CONTROLLING THE RENTAL AND SALE OF AGE-CONTROLLED MERCHANDISE AND FOR CONTROLLING ACCESS TO AGE-CONTROLLED SERVICES

[75] Inventor: Peter C. DiMaria, Somers, Conn.

[73] Assignee: The IDentiScan Company, LLC, Ellington, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/926,284

[22] Filed: Sep. 5, 1997

[51] Int. Cl.⁷ .................................................. G06K 9/00
[52] U.S. Cl. .......................... 382/115; 382/116; 382/117; 382/118; 382/128; 382/124; 340/149; 380/23
[58] Field of Search .................................. 382/115, 116, 382/117, 118, 128, 124; 380/23; 340/149

[56] References Cited

U.S. PATENT DOCUMENTS

| | | | |
|---|---|---|---|
| Re. 30,579 | 4/1981 | Goldman et al. ........................ | 340/149 |
| 3,636,318 | 1/1972 | Lindstrom et al. .................... | 235/61.12 |
| 3,702,392 | 11/1972 | St. Jean .................................. | 235/61.7 |
| 3,988,570 | 10/1976 | Murphy et al. ......................... | 235/382 |
| 4,369,361 | 1/1983 | Swartz et al. ........................... | 235/470 |
| 4,689,477 | 8/1987 | Goldman ................................. | 235/380 |
| 5,214,699 | 5/1993 | Monroe et al. ......................... | 380/23 |
| 5,284,364 | 2/1994 | Jain ......................................... | 283/87 |
| 5,337,361 | 8/1994 | Wang et al. ............................. | 380/51 |
| 5,367,148 | 11/1994 | Storch et al. ........................... | 235/375 |
| 5,471,533 | 11/1995 | Wang et al. ............................. | 380/51 |
| 5,490,217 | 2/1996 | Wang et al. ............................. | 380/51 |
| 5,559,885 | 9/1996 | Drexler et al. .......................... | 380/23 |
| 5,594,226 | 1/1997 | Steger .................................... | 235/379 |
| 5,706,507 | 1/1998 | Schloss ................................. | 707/104 |
| 5,717,776 | 2/1998 | Watanabe ............................... | 382/116 |
| 5,754,939 | 5/1998 | Herz et al. .............................. | 455/4.2 |
| 5,781,650 | 7/1998 | Lobo et al. ............................. | 382/118 |
| 5,864,623 | 1/1999 | Messina et al. ........................ | 380/23 |

OTHER PUBLICATIONS

Do You Really Know . . . Who Is Old Enough?, ©1997 Intelli–Check, Inc.
ID–Check™ Online, HTTP://www.intellicheck.com, excerpts taken from HTTP://intellicheck.com/news.htm and HTTP://www.intellicheck.com/page 14.htm.

*Primary Examiner*—Christopher S. Kelley
*Assistant Examiner*—Sheela Chawan
*Attorney, Agent, or Firm*—Volpe and Koenig, P.C.

[57] ABSTRACT

The present invention relates to a method and apparatus for controlling the distribution of age controlled merchandise or services based upon inputting personal information data encoded on an identification document, such as a driver's license, to determine whether the transaction is legal.

25 Claims, 4 Drawing Sheets

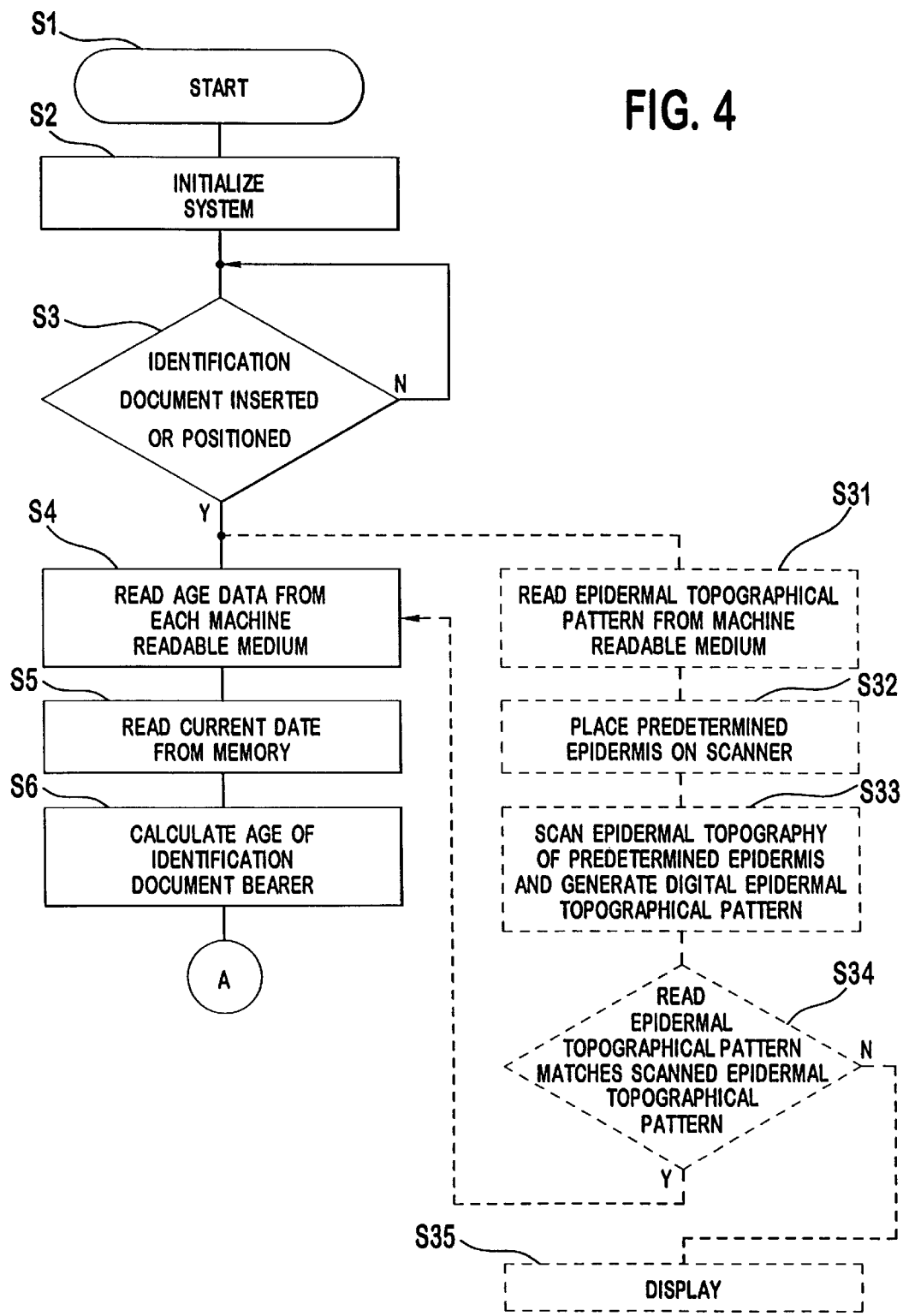

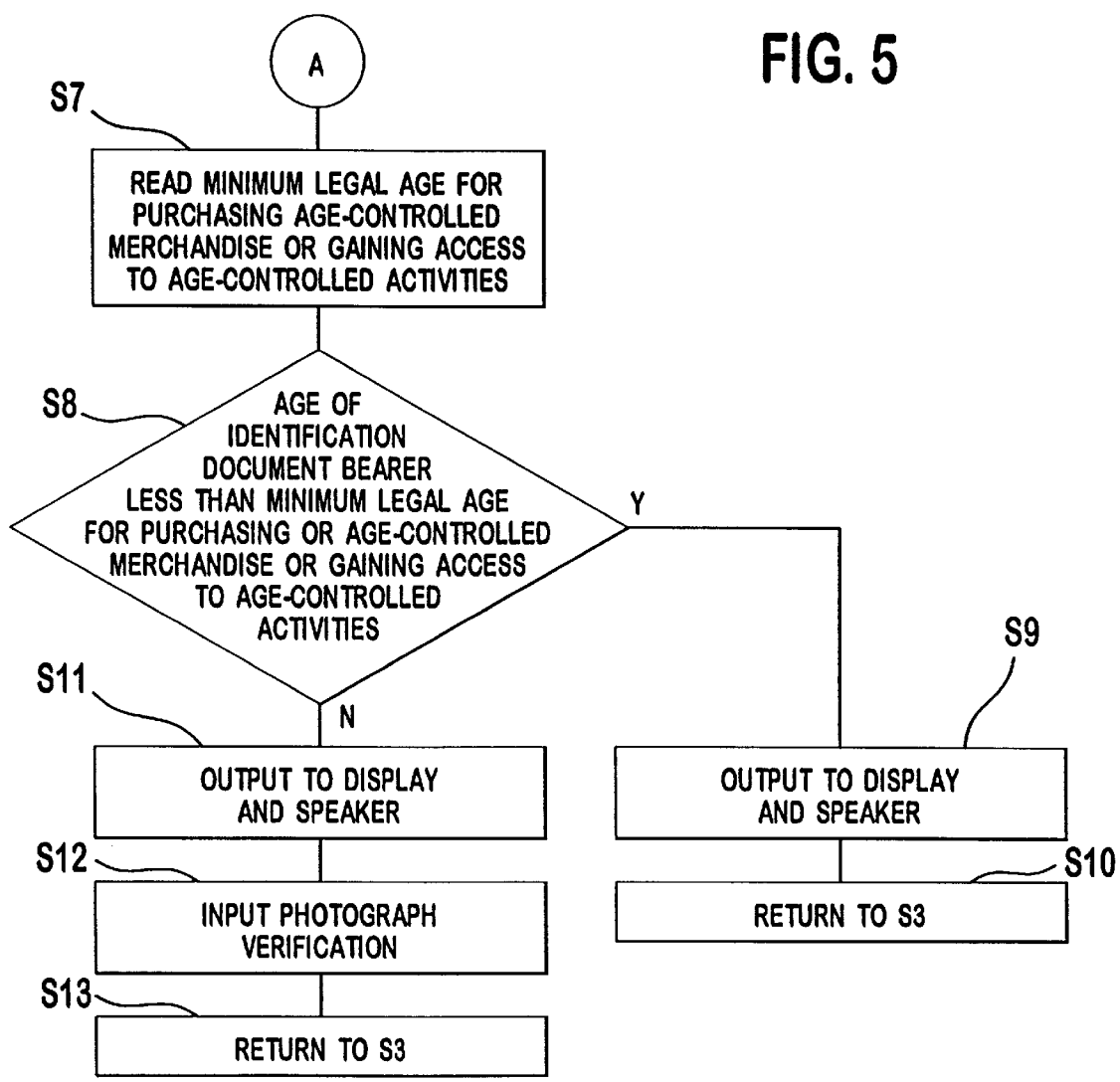

6,148,091

APPARATUS FOR CONTROLLING THE RENTAL AND SALE OF AGE-CONTROLLED MERCHANDISE AND FOR CONTROLLING ACCESS TO AGE-CONTROLLED SERVICES

BACKGROUND OF THE INVENTION

1. Field of the Invention

The present invention relates to a method and apparatus for controlling the sale of age-controlled merchandise. More particularly, it relates to accessing personalized identification information and encoded age data stored in at least one machine readable medium on an individual's identification document, such as a driver's license or other official document, to determine whether an individual is of legal age.

2. Description of the Prior Art

There are various forms of identification that are commonly accepted by businesses and government agencies as proof of age. The most convenient forms of identification are government issued documents such as a driver's license, passport, social security card, voter's registration card, and immigration card. Another example of an identification document is a smart card, which contains a memory provided by an embedded integrated circuit. These documents provide statistical information regarding the authorized bearer of the identification document in at least one machine readable medium such as a barcode or magnetic stripe. Many identifying documents have more than one machine readable medium for storing identifying information. For example, a driver's license typically includes a photograph, printed textual information and visible encoded information, such as a barcode. In some cases a magnetic stripe provides a higher level of security and additional information regarding the bearer. For example, the information stored in the magnetic stripe of a driver's license may include identifying information about the authorized bearer, such as eye color, hair color, height, weight, epidermal topographical patterns, etc. Examples of epidermal topography include digital data of bearer's fingerprint, knuckle print, palm print, etc. The identifying information may include eye patterns indicative of the iris or retina of the identification document bearer. The barcode and magnetic stripe may also include data related to ascertaining the age of the bearer. Alternatively, the above information may be stored in the memory of an embedded integrated circuit on a smart card.

The importance of the driver's license is emphasized by the fact that traffic accidents caused by underaged drivers obtaining alcohol using false driver's licenses is a major contributor to fatalities, injuries and property damage. In addition, there is a need to reduce the number of youths beginning to smoke to reduce health risks. Establishments wishing to avoid the sale of tobacco or alcohol may check the photograph and date of birth printed on driver's licenses. However, many youths have easy access to counterfeit driver's licenses. Accordingly, there is a need to confirm the correct age of a customer wishing to purchase alcohol, tobacco and other age-controlled merchandise by reading encoded data on at least one machine readable medium.

There are a number of methods and apparatuses for verifying data authenticity. For example, U.S. Pat. No. 3,636,318 discloses a verifiable identification document having a randomized unique pattern of normally invisible but mechanically detectable material (e.g. finely divided ferromagnetic material) in a zone overlapping any visible indicia. A mechanical reader scans the document to verify its authenticity. The identity of the bearer along with the unique pattern is stored in memory. When a document is later read by a mechanical reader, the bearer's name and the pattern are compared with the name and unique associated pattern stored in memory to confirm the document's authenticity.

U.S. Pat. No. 3,702,392 discloses a method and apparatus for verifying the identity of a bearer of an identification document having a plural digit identifying number as an associated security code. The authenticity of the identification document is verified by: 1) accepting a code entered by the bearer, 2) generating the security code associated with certain digits of the identifying number on the identification document, and 3) comparing the security code to the entering code to verify that the codes are the same.

U.S. Pat. No. 4,689,477 discloses a document having a verifiable composition substance and informational content. The document has a unique-counterfeit characteristic which may be machine sensed. The document is unique by reason of the opacity pattern of the document. The print and photograph alter the opacity or translucency of the document in certain specific areas. In addition, character uniqueness data is encrypted on a magnetic stripe of the identification document in that when the identification document is read, the identification document reader recognizes the document as genuine. Statistical information, such as a birth date which may be used to verify that the document is genuine, is also encrypted on the document. However, this document does not treat the question of whether the person presenting the identification document is the assigned holder.

U.S. Pat. No. 5,284,364 discloses a document security system characterized by a data substrate having a personalized polarization-altering overlay sealed to a base print and encoded with additional information readable under the influence of a polarizing viewer. Tampering with the identification document will create optical errors which become evident when the tampered document is viewed through the polarizing viewer.

U.S. Pat. No. 5,337,361 discloses a document on which encoded information is overlaid on a graphic image. The precise content of the encoded information is not important. The advantage of the coded information overlaying the photograph is that such an arrangement would make it extremely difficult to change the information on the photograph without detection.

U.S. Pat. No. 5,214,699 seeks to provide a fake-proof identification document decoding system for reading data from an EEPROM memory chip, which is located on the identification document. An identification document reader accesses the memory to obtain the unique personal identification information. Although this document suggests the use of such a chip with a driver's license, they typically do not include memory chips due to cost constraints.

Notwithstanding the above prior art efforts, there remains a need for an inexpensive device for quickly and easily ascertaining a customer's age.

SUMMARY OF THE INVENTION

The present invention provides a device for reading encoded information stored in at least one machine readable medium on an identification document, such as a driver's license. The encoded information may be visibly encoded on the document (e.g. a barcode), stored on a magnetic stripe or stored on any other type of machine readable medium. The device uses the encoded age data to calculate the age of the bearer using the current calendar data. After calculating the age, the device preferably prompts an operator to make an additional comparison of the photograph on the identification document with the bearer. The operator of the device indicates a positive match by pushing a keypad button. For added security, the authorized bearer's epidermal topography may be stored in a machine readable form on the identification document. That epidermal topography can be read from the identification document and compared with the scanned epidermal topography of the presenter for verification. The device may have a time of use function to indicate when the operator begins and ends utilizing the device.

Accordingly, it is an object of the present invention to provide an inexpensive method and apparatus to check age data on a bearer's identification document and to alert an operator as to whether the bearer may purchase or rent age-controlled merchandise or services. Age-controlled merchandise includes but is not limited to lottery tickets, pornographic materials, guns and ammunition, fireworks, condoms, smoking patches, medical supplies, alcohol, tobacco, moving vehicles, tapes and movies. The apparatus may also prevent access to age-controlled services including but not limited to gambling, theaters, adult entertainment, and other entertainment.

BRIEF DESCRIPTION OF THE DRAWINGS

FIGS. 4 and 5 are flow charts illustrating the method steps of an embodiment of the present invention.

DESCRIPTION OF THE PREFERRED EMBODIMENTS

The preferred embodiments are described with reference to drawing figures wherein the numerals represent like elements throughout.

Figure 1:
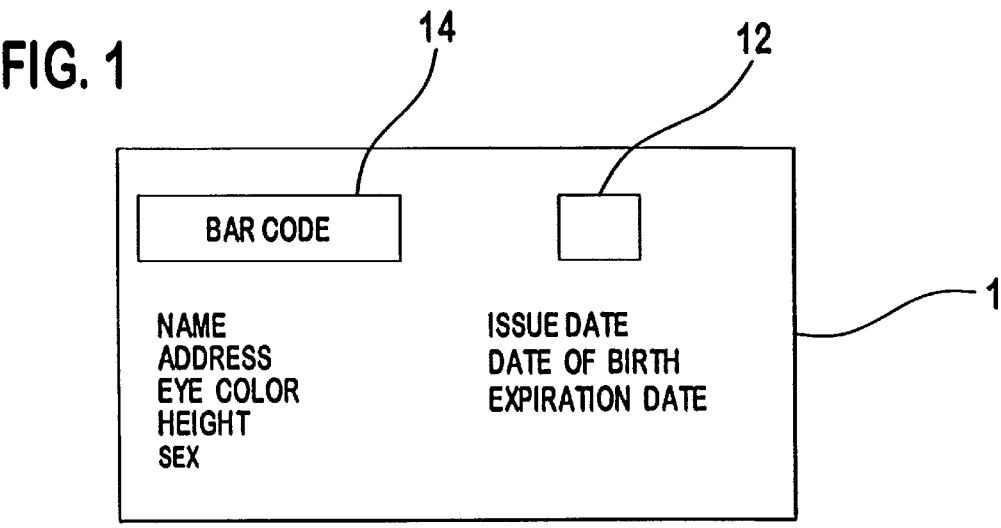
FIG. 1 is a block diagram of a typical identification document, such as a driver's license.

FIG. 1 shows a front face of an identification document 10 having a photograph 12 and a visible machine readable code 14. The identification document 10 can be anything, printed, written, encoded, etc., which is relied upon to record data or provide identification. Preferably, it is an official document or government issued document. Any machine readable media storing identifying information may be placed on the identification document 10. The identification document 10 preferably contains human readable personal identification information such as the bearer's name, address, eye color, and height. The same personal identification information may be encoded in the machine readable form. Age data such as date of birth, identification document issue date and identification document expiration date is preferably included data in the machine readable form.

Figure 2:
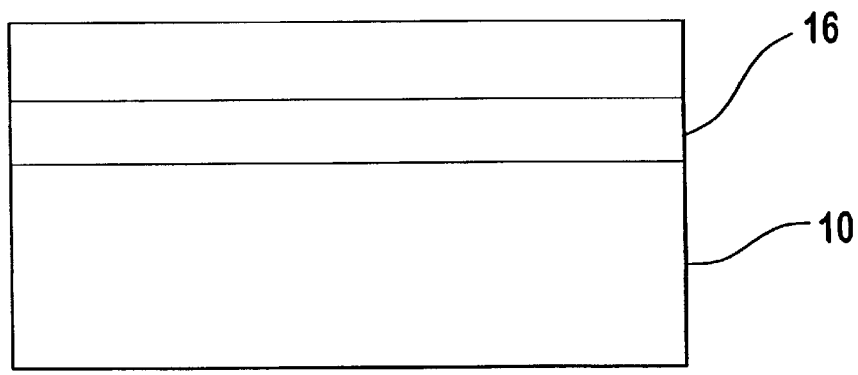
FIG. 2 is a block diagram of a typical rear face of a FIG. 1 identification document.

FIG. 2 shows the rear face of the identification document 10 which includes a magnetic stripe 16. The personal identification information from the front is also preferably encoded on the magnetic stripe 16. In addition, age data such as date of birth, identification document issue date, age at issue date and identification document expiration date is preferably encoded on the magnetic stripe 16. It is also preferred that some personal characteristic, such as an epidermal topographical pattern, iris pattern or retina pattern, be encoded on the magnetic stripe 16.

Figure 3:
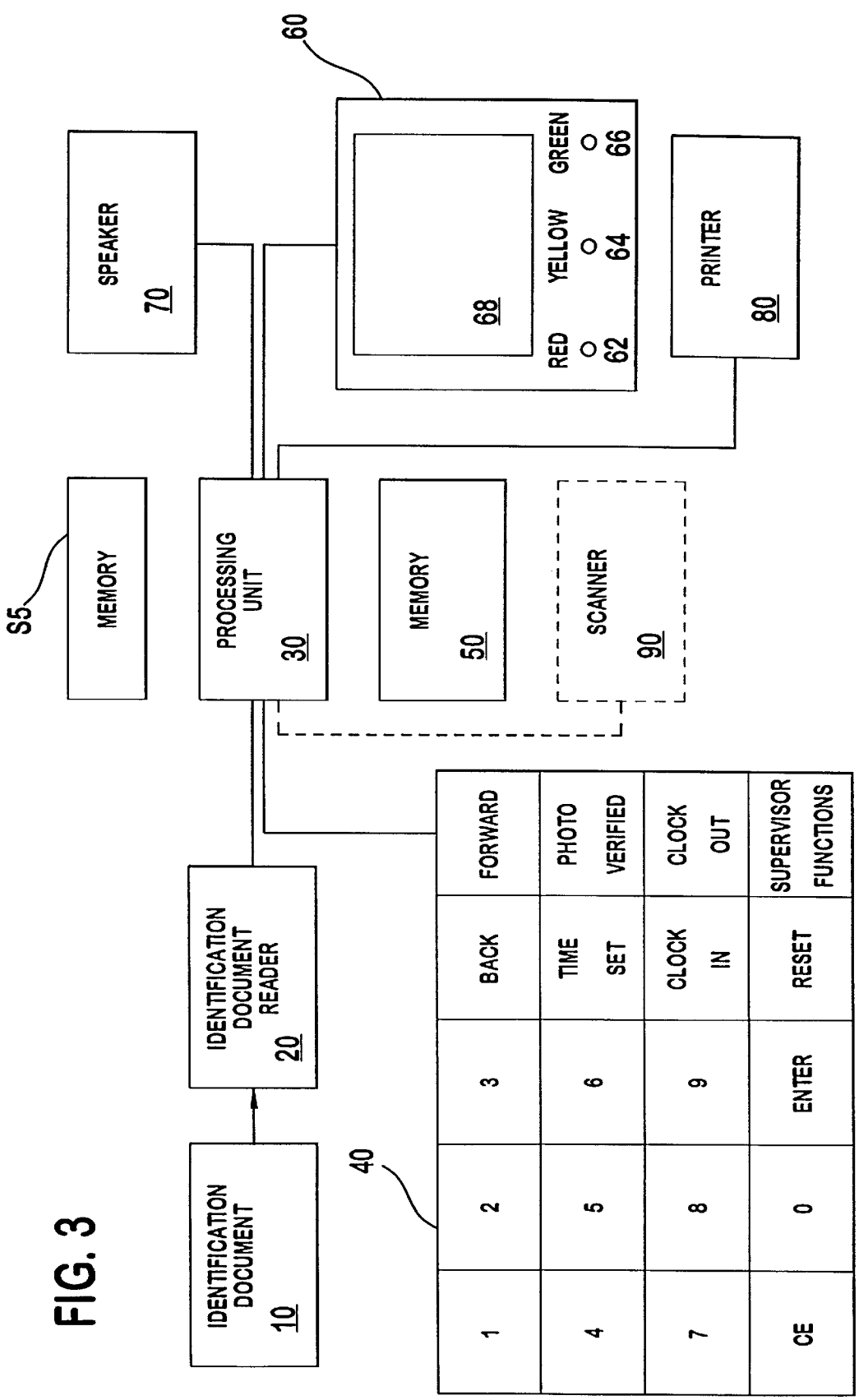
FIG. 3 is a block diagram of one embodiment of the present invention.

FIG. 3 shows a system for reading identification document 10 having a barcode 14, magnetic stripe 12 or both.

The system of FIG. 3 includes an identification document reader 20 connected to a processing unit 30, such as an eight-bit processor. A keypad 40 is also connected to the processing unit 30. The processing unit 30 accesses a memory 50, which is preferably an EPROM, and a memory 55, which is preferably 16k of RAM. The processing unit 30 outputs signals to a display 60, a speaker 70 and a printer 80. The display 10 may contain a plurality of LCDs or a screen. A personal computer could be substituted for processing unit 30, keypad 40, memories 50 and 55, speaker 70 and display 80. A personal physical characteristic scanner 90 is also connected to processing unit 30. An example of a personal characteristic scanner is an epidermal topographical scanner, which generates epidermal topographical patterns. A retina or iris scanner are other examples of personal physical characteristic scanners.

The processing unit 30 determines whether the bearer can purchase or rent age-controlled merchandise or gain access to an age-controlled activity based upon the bearer's age. The presented identification information, age data, current date, current time, and whether the bearer was authorized to purchase or rent age-controlled merchandise or gain access to age-controlled services is stored in a journal in memory 55. The journal may be accessed for printing of a report by printer 80.

The legal ages for purchasing age-controlled merchandise or gaining access to age-controlled services is preferably set in the system at the factory. However, a supervisor can input a PIN number through keypad 40 to change the legal age required to purchase age-controlled merchandise or gain access to age-controlled services. In addition, the current time and date can be set by entering a PIN number via the keypad 40.

The preferred system preferably also includes a time and attendance function. For example, an operator is required to enter a code via keypad 40 before beginning a shift at that position and to input a code to indicate the end of a shift. This time and attendance information can be used for payroll, comparisons with cash receipts in an attempt to ascertain whether an operator is selling age-controlled merchandise without verifying the age of the purchaser and the authenticity of the identification documents.

The display 60 preferably includes a red 62, a yellow 64, and a green 66 light emitting devices. Other colors or additional lighting devices may be used. The display 60 also preferably includes a display screen 68. The light emitting devices indicate the results of computations performed by the processing unit 30 and the screen 68 may confirm them or provide instructions to the operator.

The method for utilizing the system is generally shown in the flow diagrams of FIGS. 4 and 5. After the system is started by the operator (S1), the system is automatically initialized (S2). An identification document 10 is inserted into or otherwise positioned to be scanned by identification document reader 20 (S3).

The identification document reader 20 reads at least one of the machine readable medium such as the visible machine readable code 14 or the data encoded on the magnetic stripe 16 of identification document 10 and transmits the data to processing unit 30(S4). The processing unit 30 maintains the current date and time and reads the current date and time from a register or memory (S5). The processing unit 30 receives the age data from identification document reader 20 and calculates the age of the bearer of the identification document 10 using the current date and age data (S6).

The age of the bearer of the identification document 10 may be calculated in a variety of ways using the age data and the current date. For example, the date of birth read from the identification document 10 may be subtracted from the current date. If the age data included the bearer's exact age on the date the bearer's identification document issued 10, the identification document 10 issued date could be used with the day of birth, month of birth and current date to ascertain the bearer's age. If the age data included the bearer's exact age on the date the bearer's identification document 10 expired, the identification document 10 expiration date could be used with the day of birth, month of birth and current date to ascertain the bearer's age. The above examples are intended to be instructive rather than restrictive because there are many different ways to encode age data and ascertain the actual age of the bearer therefrom.

Once the bearer's age has been determined, the known legal age for purchasing or renting age-controlled merchandise or gaining access to age-controlled services is read from memory 50 (S7). If the bearer's age is less than the required minimum legal age, the processing unit 30 outputs a signal to display 60 and speaker 70 (S9). After the display 60 receives the signal, the light emitting device 62 is lit, the screen 68 advises the operator of the system that no sale, rental or service is authorized and the speaker 70 emits a predetermined number of beeps. After a predetermined time period, the system returns to step S3 (S10).

If the bearer's age is greater than or equal to the minimum age for purchasing or renting age-controlled merchandise or gaining access to age-controlled services, the processing unit 30 outputs a signal to the display 60 or speaker 70 (S11). After the display 60 receives the signal, the light emitting device 66 is lit. The screen 68 advises the operator that sale, rental or the service is authorized. The speaker 70 may emit a predetermined number of beeps to indicate the same condition.

Under suspicious circumstances, the screen 68 may prompt the operator to compare the photograph 12 or identification document 10 with the bearer before selling or renting controlled merchandise to the bearer or before permitting the bearer to access age-controlled services. If the operator inputs verification that the photograph 12 on the identification document 10 matches the appearance of the bearer (S12), the sale is authorized. If not, the sale is rejected. After a predetermined period of time or functional operation, the system returns to step S3 (S13).

If the bearer's age is only greater than or equal to the minimum age for purchasing or renting only some of the age-controlled merchandise or gaining access to only some age-controlled services, the processing unit 30 outputs a signal to the display 60 or speaker 70. After display 60 receives the signal, light emitting device 64 is lit, and the screen advises the operator as to the merchandise which can be sold or rented to the bearer. The screen may also advise the operator as to the age-controlled services which may be rendered to the bearer. This comparison is performed at step S8 in the flow charts of FIGS. 4 and 5.

For increased security, the identifying document may include an encoded epidermal topographical pattern stored in a machine readable form. After the identification document is inserted or positioned (S3), the stored epidermal topographical pattern is read from the machine readable medium (S31). The identification document bearer places the corresponding epidermis on the personal physical characteristic scanner 90 (S32) and a digital epidermal topographical pattern is generated (S33). If the read epidermal topographical pattern matches the scanned epidermal topographical pattern, the age data may be read from the machine readable medium (S34). If the read epidermal topographical pattern does not match the scanned epidermal topographical pattern, the display provides a message indicating that the scanned epidermal topographical pattern did not match the read epidermal topographical pattern (S35). If there is no match, this will indicate that the card bearer has provided a false identification. Alternatively, an iris or retina scanner could be substituted for the epidermal topographical scanner.

I claim:

1. An apparatus for assisting an operator's decision making in connection with controlled activities that require a minimum participant age based upon encoded data stored on an identification document, the apparatus comprising:

means for inputting a code associated with a beginning or an end of an operator's shift;

means for recording the code and a time of the code's input;

means for reading the encoded data and generating an encoded data signal;

means for providing a comparison data signal;

processing means for receiving the encoded data signal and the comparison data signal, determining if the encoded data supports at least the minimum age, and outputting an age control signal;

means for prompting the operator to make a visual comparison;

means for inputting the results of the operator's comparison; and means for receiving the age control signal and the operator's input, and outputting a human recognizable indicator of whether the presented document indicates that a potential participant is of at least the minimum age for the controlled activity.

2. The apparatus of claim 1 wherein the identification document is a driver's license.

3. The apparatus of claim 1 wherein the prompting means further comprising display means which prompts an operator to compare a picture on the identification document with a bearer of the identification document.

4. The apparatus of claim 1 further comprising a data input unit for use by the operator.

5. The apparatus of claim 4 wherein the input unit permits inputting of current date and time data.

6. The apparatus of claim 1 wherein the reading means is a barcode reader.

7. The apparatus of claim 1 wherein the reading means reads the encoded data from a magnetic stripe.

8. The apparatus of claim 1 wherein the human recognized indicator includes multiple light emitting devices.

9. The apparatus of claim 1 wherein the human recognized indicator includes a sound emitter.

10. The apparatus of claim 1 wherein the human recognizable indicator is printed.

11. The apparatus of claim 1 further comprising memory means for storing the encoded data and the comparison data.

12. The apparatus of claim 1, wherein the encoded data includes an age parameter selected from a group comprised of a date of birth, an identification document issue date, an identification document expiration date, an age as of the identification document issue date, and age as of the identification document expiration date.

13. The apparatus of claim 1 wherein the controlled activity concerns an item selected from a group comprised of alcohol, tobacco, pornography, gambling activities, theaters, adult book stores, concerts, bars, clubs, festivals, racing, adult entertainment services, guns, ammunition, medical devices, cars, boats, tapes and movies.

14. The apparatus of claim 1 wherein the encoded data is stored in a machine readable medium.

15. The apparatus of claim 1 further comprising means for storing a minimum age for an age controlled activity.

16. The apparatus of claim 1 further comprising means for inputting a password to permit authorized changes to the comparison data.

17. The apparatus of claim 1 further comprising means for storing multiple minimum ages.

18. A method for controlling activities that require a minimum participant age based upon age data encoded on a presented identification document comprising the steps of:

inputting a code associated with a beginning or an end of an operator's shift;

recording the code and a time of the code's input;

presenting the identification document to an encoded data reader that generates an encoded data signal;

supplying a current date signal;

comparing the encoded data signal and current date signal;

determining whether the comparison supports at least the minimum age for the controlled activity and generating an age determination signal;

prompting an operator to make a visual comparison;

receiving an input from an operator indicating a result of the visual comparison; and receiving the age determination signal and the operator's input, and outputting a human recognizable indicator of whether the presented document indicates that a potential participant is of at least the minimum age for the controlled activity.

19. The method of claim 18 wherein the identification document is a driver's license having encoded information in a machine readable form.

20. The method of claim 18 wherein the step of prompting prompts an operator to make a visual verification between human readable information on the identification document against a presenter's appearance.

21. The method of claim 18 further comprising the steps of:

inputting an operator authorization code;

checking the authorization code to determine whether the operator is authorized to change the date signal; and enabling an authorized operator to input changes in the date signal.

22. The method of claim 18 wherein the age data includes information selected from a group comprised of date of birth, identification document issue date, identification document expiration date, age of presenter at identification document issue date, and age of presenter at identification document expiration date.

23. The apparatus of claim 1 wherein the encoded data includes a date of birth and the comparison data signal includes a current date, and the processing means determines if the encoded data supports at least the minimum age requirement by comparing the date of birth with the current date.

24. The apparatus of claim 23 wherein the age determination is made by subtracting the date of birth from the current date.

25. The method of claim 18 wherein the age data includes a date of birth and the comparing step further comprises subtracting the date of birth from a current date within the current date signal.

* * * * *

UNITED STATES PATENT AND TRADEMARK OFFICE
CERTIFICATE OF CORRECTION

PATENT NO : 6,148,091
DATED : November 14, 2000
INVENTOR(S) : DiMaria et al.

It is certified that error appears in the above-identified patent and that said Letters Patent are hereby corrected as shown below:

On title page,
Under the heading "United States Patent [19]", delete "DiMaria" and insert therefor --DiMaria et al.--.

Next to the heading "[75] Inventor:", under "Peter C. DiMaria, Somers, Conn.", insert --James T. Madsen, Enfield, Conn.--.

Signed and Sealed this

Twenty-ninth Day of May, 2001

*Attest:*

NICHOLAS P. GODICI

*Attesting Officer*    *Acting Director of the United States Patent and Trademark Office*